Inventors
Charles A. Costello
Henry J. Richards
Adolph J. Wesolowski
by Vernon F. Kalb
Their Attorney

United States Patent Office 3,065,367
Patented Nov. 20, 1962

3,065,367
DYNAMOELECTRIC MACHINE
Charles A. Costello, Henry J. Richards, and Adolph J. Wesolowski, Erie, Pa., assignors to General Electric Company, a corporation of New York
Filed Sept. 15, 1958, Ser. No. 760,899
6 Claims. (Cl. 310—271)

The invention described herein relates to dynamoelectric machines and, more particularly, to an amortisseur winding construction adapted for use in the salient pole rotors of motors and generators.

The use of a damping or amortisseur winding on the poles of a rotor of a dynamoelectric machine for eliminating the undesirable harmonics which have adverse effects on the wave shape of the machine and electrically damping subtransient voltage variations is well known in the electrical machinery art. Moreover, amortisseur circuit constructions capable of withstanding high centrifugal forces and differential thermal expansions of high performance salient pole rotors of, say, 7 inches in diameter operating at 12,500 revolutions per minute are well known. However, such amortisseur circuit constructions have either utilized long end turn members of relatively high impedance or have been formed of components substantially heavier than those required for the electrical characteristics of the machine so as to be capable of withstanding the centrifugal forces involved. It is, therefore, obviously desirable and it is the purpose of this invention to provide a simple and inexpensive amortisseur construction wherein the winding impedance is minimum and the over-all ability to withstand the influence of centrifugal forces is maximum.

Briefly stated in accordance with one aspect of our invention, pole face amortisseur bars are provided with end turns formed of copper mechanically secured to the outer periphery of the end lamination of each pole piece so as to be supported thereby. The interpole or quadrature axis end turn of the amortisseur winding is an annular flexible ring of copper positioned around the end turns of the salient pole windings between the windings and the banding wire which serves to support the windings. This construction, in addition to serving as a quadrature end turn connection for the amortisseur winding, also serves to prevent damage to the insulation as a result of "cut through" by the individual turns of the banding wire.

The subject matter which we regard as our invention is particularly pointed out and claimed in the concluding portion of this specification. Our invention, however, as to its organization and method of operation, together with further objects and advantages thereof, will best be understood by reference to the following description taken in connection with the accompanying drawing, in which:

Figure 1:
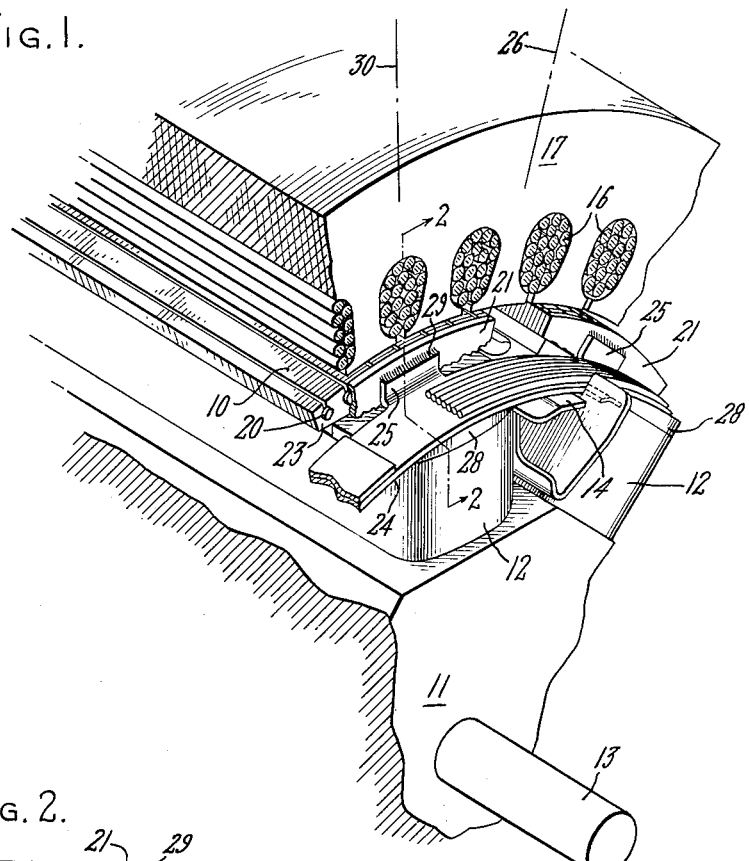
FIG. 1 is a perspective view, substantially broken away, of a portion of a dynamoelectric machine including the structure of our invention.

Referring to the drawing wherein like reference characters designate corresponding parts throughout the several views, there is shown a dynamoelectric machine having a salient pole piece 10 on a rotor 11 supporting a field producing winding 12. The rotor 11 is mounted on a rotatable shaft 13 so that when the windings 12 are energized, the rotating field produced by windings 12 will induce a voltage in the windings 16 of the stator 17 in a manner well known to the generator art.

Figure 2:
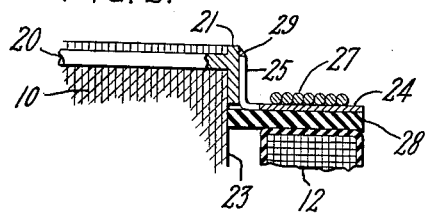
FIG. 2 is a cross-sectional view of a portion of the rotor, taken along the lines 2—2 of FIG. 1.

In order to dampen certain undesirable characteristics such as harmonic voltages and extreme voltage variations induced in windings 16 under transient conditions as when the load is changed abruptly, it has been the practice to provide an amortisseur shunting circuit. As shown in FIG. 2, the amortisseur circuit comprises a plurality of inductive copper bars 20 positioned as pole face windings on salient pole pieces 10. In order to connect electrically the separate amortisseur bars 20 at their ends, we provide an end turn member 21.

It has been found that if the copper bars themselves provide the sole support for the end turn member 21, the centrifugal forces encountered in high speed machines will result in fatigue damage in the form of cold flow of the highly stressed copper at the junction between the bars 20 and the end turn member 21 which will eventually result in fracture. In order to avoid this, there is provided, according to one of the important aspects of our invention, an additional means for mechanically supporting the end turn member 21 against centrifugal forces. As shown in FIG. 1, this additional support is provided by securing the conductive end turn member 21 directly to the end lamination 23 of magnetic material. To accomplish this, we initially pickle or otherwise remove the oxides from the outer surface of the end lamination 23, or initially form the end lamination 23 from an unannealed or a copper clad sheet material. Pure copper is then applied to the outer peripheral portion of the end lamination 23 by being welded thereto. In practice, we have found that this can be done by a welding process wherein pure copper weld rods are melted, or puddled, on the desired area in an inert or reducing atmosphere until a sufficient cross-section of copper build-up is obtained. Since, according to our preferred embodiment, the amortisseur bars 20 initially protrude at least ⅛ inch from the ends of the laminations 10, as best shown in the broken away portion of copper bar 21 in FIG. 1, the weld material is at the same time integrally joined to the several bars 20 during the puddling operation. We have found that this welding process produces an end turn 21 of dense non-porous copper having minimum electrical resistance. We have also found that it is most practical to provide a build-up of copper weld material on the end lamination of a greater amount than that which is required for the desired electrical characteristics so that outwardly axial and radial surfaces of the weld material 21 can be machined to the final dimensions to provide smooth surfaces, and for improved mechanical balance.

Since the end turn member 21 is thus secured to the welding by end lamination 23, it is apparent that centrifugal forces imposed on member 21 will be mechanically restrained due to the support provided by end lamination 23. Thus, this construction relieves the stress concentration at the juncture of the copper bar 20 and the member 21, and prevents fatigue damage due to the cold flow which would otherwise be encountered.

Figure 3:
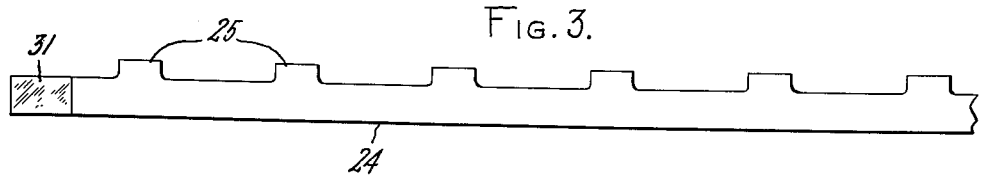
FIG. 3 is a developed plan view of the member forming the quadrature axis end turn.

Turning now to FIG. 3, there is shown a strip of copper which is used to provide the quadrature end turn connection of the amortisseur winding. As will further be explained below, strip 24 also serves an additional function in connection with the end turn banding support of the end turns of winding 12.

In the rotor construction shown in FIGS. 1 and 2, the strip 24 provides an electrical connection between the end turn members 21 of the several pole pieces to provide a minimum length (and hence minimum impedance) end turn connection for the quadrature axis 26 of the machine. The strip 24 is positioned around the end turns of the several windings 12 and top sticks 14. After the strip is thus positioned, radially extending detents 25 are copper welded at their upper edges as indicated at 29 to the direct axis of the end turn members 21.

Further, in accordance with our invention, the strip 24 by being positioned over the end turns and top sticks serves an additional function. In relatively high speed machines having rotating windings such as 12, it is necessary to provide supplementary support to prevent the radial displacement of the winding end turns under the influence of centrifugal force. A usual means for accomplishing this is to provide a plurality of turns of steel banding wire which is pre-tensioned over the end turns of the windings. However, in the absence of some protection, the stresses encountered during operation may be sufficient to cause the individual strands of the banding wire to cut through the end turn insulation and cause the failure of the winding. In order to prevent failures of this type, it has been the practice to place a strip of metal between the banding wire and the end turn insulation. In accordance with our invention, we position the quadrature axis end turn member 24 over the end turns and under the banding wire 27 so that it serves this function. We have found it desirable, in order to prevent buckling of the strip 24, to overlap the ends of strip 24, which are silver plated, as indicated at 31 in FIG. 3, to provide good electrical contact so that the pressure between the unbrazed overlapped portions maintains a low resistance connection.

By bending the detent 25 radially with respect to the annular portion of the strip 24, we provide a flexible connection between the end turn 21 and the strip 24 to accommodate variations in radial or axial distances between the punchings and the end turns of the windings due to the influence of centrifugal force or the difference in relative elongations of these parts due to thermal expansion. Thus, severe mechanical stresses otherwise incident to such relative movements are avoided.

Figure 4:
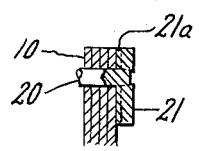
FIG. 4 is a fragmentary view of a modified form of one aspect of our invention.

Turning now to FIG. 4, there is shown a modified form of one aspect of this invention. As shown, the amortisseur bars 20 protrude beyond the end of the punchings 10. A prefabricated end turn member 21 having a plurality of apertures to accommodate the several bars 20 of a salient pole is provided. In addition, a similarly shaped sheet of a brazing material, such as silver solder, of, say, 5 mils thickness, is positioned between the end turn member 21 and the end lamination 23. Through the application of heat by any suitable means, the silver solder is melted to braze the end turn member 21 to the lamination 23 and also to electrically connect it to bars 20. We prefer, in order to minimize electrical resistance in the junction between the bars 20 and the end member 21, to taper the openings in 21 and the bars 20 so as to provide a tight or interference fit between the bars 20 and the openings in the member 21.

Figure 5:
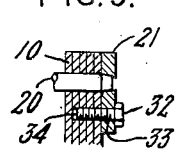
FIG. 5 is a fragmentary view of a second modified form of the same aspect of our invention as shown in FIG. 4.

Turning now to FIG. 5, there is shown another modified form of the direct axis amortisseur end turn construction 21 which provides increased mechanical support for the end turn. The amortisseur bars 20 protrude beyond the end of the punchings 10 and preferably are slightly tapered as indicated. A prefabricated direct axis end turn member 21 having a plurality of aperture to accommodate the several amortisseur bars 20 is provided. The amortisseur bars 20 and the end turn member 21 are electrically connected by any suitable means as, for example, by welding or brazing. To provide for mechanically supporting direct axis end turn member 21 by the laminations 10, one or more fastening members such as screws 32 are inserted through openings 33 in the end turn member 21 into aligned openings 34 of the laminations.

Tests have been made to compare the electrical performance of a machine incorporating our invention as indicated in FIGS. 1 and 2 with a similar prior art machine wherein an end punching formed of copper and brazed to the amortisseur bars 20 was utilized to form the end connections of the amortisseur circuit. In such prior art constructions, the quadrature axis amortisseur current, which will often during transient conditions reach an instantaneous calculated value of thousands of amperes, flow down the copper end punching to the spider 12 and then up the adjacent pole to complete the amortisseur circuit. The tests indicate that the ratio of the sub-transient reactance of the amortisseur winding about the quadrature axis 26 to that about the direct axis 30 of a 60 k.v.a. generator having such prior construction is nearly 2 to 1. The corresponding ratio for a 60 k.v.a. generator embodying our invention as shown in FIGS. 1 and 2 is approximately 1.5 to 1. Thus, test results on this 60 k.v.a. generator embodying our invention as illustrated in FIGS. 1 and 2 showed a reduction of 20 percent in the negative sequence impedance of the generator which results in a 20 percent reduction in the extent of the unbalanced voltages resulting from unbalanced loads and a more than 50 percent reduction in the third harmonic voltage in the output of the generator under all loads from no load to full load. This results in a 20 percent reduction of the peak transient voltage variations when applying and removing any load. Because of the improved reactive and resistive characteristics of our new amortisseur circuit, considerably more symmetrical relationships exist between the amortisseur damping effects on the quadrature axis 26 and the direct axis 30 with the result that the electrical stability of the machine is increased and the thermal and electrical losses are reduced.

While we have illustrated and described the amortisseur bar construction applied to one end of a rotor of a dynamoelectric machine, it is obvious that the same construction could also be utilized at the opposite end of the machine. In addition, while we have illustrated and described particular embodiments of our invention, other modifications will occur to those secured in the art. We intend, therefore, to cover in the appended claims all such modifications which fall within the true spirit and scope of our invention.

What we claim as new and desire to secure by Letters Patent of the United States is:

1. A dynamoelectric machine having a laminated salient pole rotor, a field producing winding surrounding each of the salient poles of said rotor and having an end turn portion extending axially from the ends of said poles, damper winding bars in the pole face portions of said salient poles, means for joining the bars of each salient pole together and means for connecting the means for joining of the salient poles together comprising an annular band of electrically conductive material positioned around said winding end turns, and banding means overlying said annular band to support the end turns against centrifugal force.

2. A dynamoelectric machine having a laminated salient pole rotor, a field producing winding surrounding each of the salient poles of said rotor and having an end turn extending axially from the ends of said poles, damper winding bars in the pole face portions of said salient poles, means for joining the bars of each salient pole together and means for connecting the means for joining the salient poles together comprising an annular band of electrically conductive material surrounding said winding end turns, said annular band having radially extending detent portions welded to said means for joining to electrically connect said annular band to said means for joining.

3. A dynamoelectric machine having a laminated salient pole rotor, a field winding surrounding each of the poles of said rotor and having an end turn extending axially from the ends of the respective poles, damper winding bars in the pole face portions of said salient poles, a copper end ring joining the bars of each salient pole together to provide electrical connections therebetween, said end rings being welded to the end lamination of each respective pole for mechanical support thereon, and means for connecting the end rings together comprising an annular copper band surrounding said winding end turns, said annular band having radially extending detent portions for electrically connecting said band to said end rings, and banding wire wrapped around said annular band to support the end turns against the effects of centrifugal force whereby said annular band also serves to prevent the individual strands of banding wire from cutting the insulation on said end turns.

4. A dynamoelectric machine comprising a salient pole rotor, formed of a plurality of laminations of magnetic material, laterally spaced damper winding bars in the pole face portions of each salient pole extending longitudinally through said laminations with free ends protruding therefrom, means joining the protruding ends of bars on each salient pole together, comprising electrical conductive material secured directly to the end lamination of each pole for mechanical support thereon.

5. A dynamoelectric machine as recited in claim 4 wherein said means joining the protruding ends of said bars on each salient pole together comprises a deposit of metal of a similar metallic composition as said damper bars, forming a homogeneous damper bar connection integrally joining the damper winding bars.

6. A dynamoelectric machine comprising a salient pole rotor, formed from a plurality of laminations of magnetic material, laterally spaced damper winding bars in the pole face portions of each salient pole extending longitudinally through said laminations with free ends protruding therefrom, means joining the protruding ends of bars on each salient pole together, comprising bodies of electrical conductive material integrally bonded to the end lamination of each pole for mechanical support thereon, and means for electrically connecting together all of said means for joining.

References Cited in the file of this patent
UNITED STATES PATENTS

| | | |
|---|---|---|
| 2,209,334 | Jungk | July 30, 1940 |
| 2,872,605 | Moore et al. | Feb. 3, 1959 |